Dec. 28, 1926.
E. D. WITTMANN
1,612,685
PUMP FOR WATER COOLED ENGINES
Filed May 27, 1925
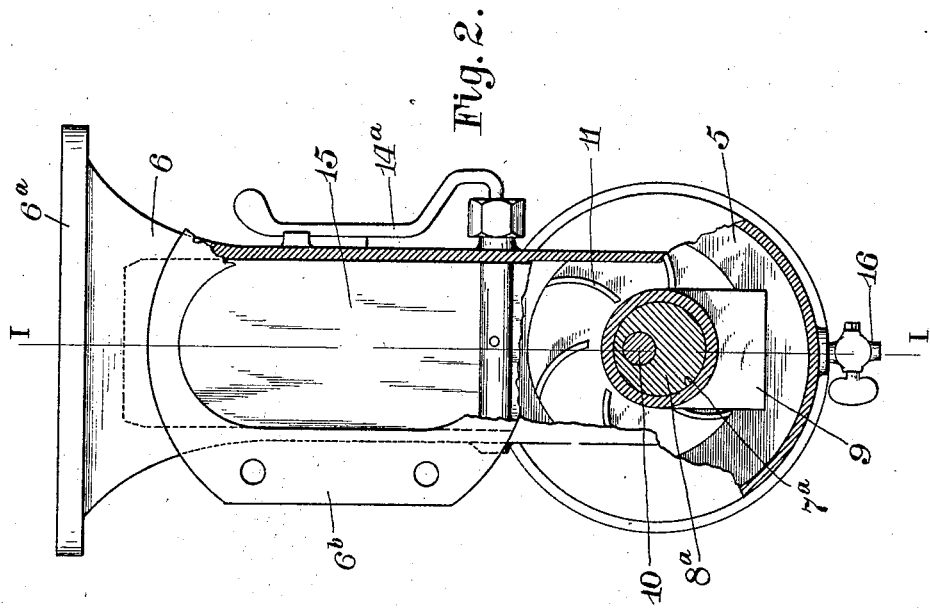
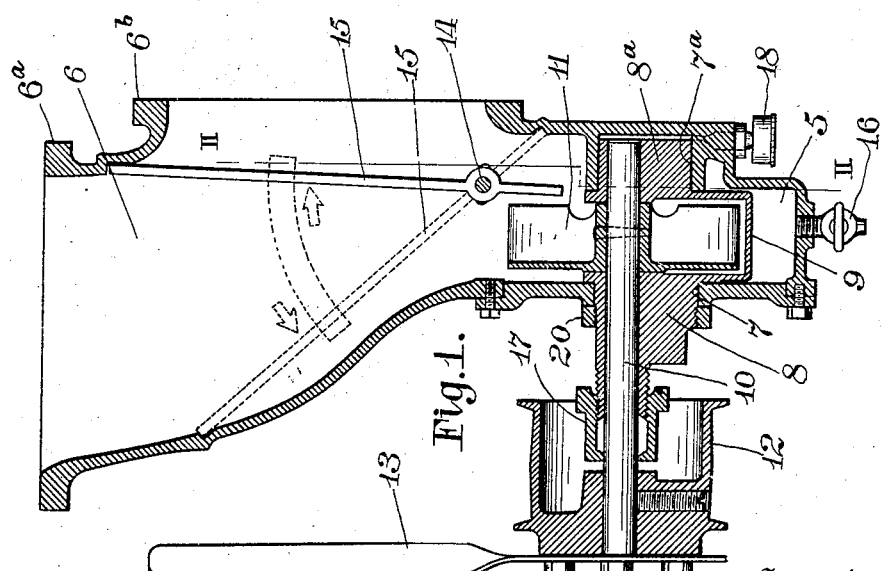
Inventor
EDWARD D. WITTMANN
his Attorneys Patented Dec. 28, 1926.

1,612,685

UNITED STATES PATENT OFFICE.

EDWARD D. WITTMANN, OF COLUMBUS, OHIO.

PUMP FOR WATER-COOLED ENGINES.

Application filed May 27, 1925. Serial No. 33,268.

The invention is designed more especially as herein shown for use in connection with the water cooling system of the "Ford" automobile or "Fordson" tractor but the principle thereof can perhaps be adapted for other motor vehicles where the pump can be operated by the fan shaft.

The invention consists more particularly in improved means for mounting the fan shaft on which I also mount the pump impeller, so that the tautness of the driving belt can be adjusted without displacing or affecting the efficiency of the pump impeller. The invention also embraces other features in such a pump such as hereinafter described and particularly claimed.

In the accompanying drawing showing an embodiment of the invention,

Figure 1 is a vertical section of the pump on the line I—I Fig. 2, and

Fig. 2 is mainly an elevation with parts in section on the line II—II Fig. 1.

In the views 5 designates the pump chamber to which is bolted a hollow connecting member 6 the upper open end of which is provided with a flange $6^a$ for bolting the connecting member to the radiator while its rear side is provided with an opening having a flange $6^b$ for bolting it to the engine so as to form through the connecting member a water passage from the engine to the radiator.

The opposite front and rear walls of the pump chamber are provided with large circular axially alined bearings, as shown at 7 and $7^a$, in which are supported trunnion-like shaft parts 8 and $8^a$ connected together by a depressed yoke-shaped bridging piece 9 so that the two shaft parts 8 and $8^a$ can be rocked in unison in their respective bearings. These shaft parts are bored eccentrically to receive the fan shaft 10; and pinned on said shaft between the aforesaid parts 8 and $8^a$ is the pump impeller 11. The outer and forward end of the shaft 10 has secured to it by a set screw the fan belt pulley 12 and to said pulley is secured the usual fan 13 one blade only of which is shown.

Pivoted between the sides of the connecting member 6 is a shaft 14 to which is secured a valve 15 adapted to be thrown, as shown in full line position, to impel the flow of water to the pump chamber and through the cooling system; and as shown in broken lines, to permit the usual or gravitational circulation resulting from the difference in temperature at the top and bottom of the body of water in the cooling system.

A pet cock at 16 is shown for the purpose of draining sediment accumulatitng in the pump chamber.

An ordinary packing nut is provided at 17; and the bearings of the fan shaft can be lubricated by such a grease cup as shown at 18.

In practice the fan belt is tightened or loosened by turning in the appropriate direction the shaft parts 8 and $8^a$ in their bearings, the jam nut 20 being first loosened to permit such adjustment, after which said nut is tightened to secure the shaft parts in adjusted position.

An outer end of the shaft of the cut off valve 15 is provided with a handle $14^a$ externally of the hollow connecting member for shifting said valve to the position desired.

The forms of the parts can be changed without departing from the gist of the invention as claimed.

What I claim is:

In combination with a pump chamber having opposed bearings, shaft parts connected by a yoke-like bridge and rockably mounted in said bearings, a driven shaft eccentrically journaled in said shaft parts and an impeller mounted on said driven shaft between said shaft parts.

EDWARD D. WITTMANN.